No. 686,414. Patented Nov. 12, 1901.
A. E. MILLER.
BROOM SEWING MACHINE.
(Application filed Feb. 7, 1900.)

(No Model.) 8 Sheets—Sheet 1.

Witnesses
J. G. Hinkel
C. W. Clement.

Inventor
A. E. Miller
By Watson & Watson
Attorneys

No. 686,414.  
A. E. MILLER.  
BROOM SEWING MACHINE.  
(Application filed Feb. 7, 1900.)  
(No Model.)

Patented Nov. 12, 1901.

8 Sheets—Sheet 3.

Witnesses  
Inventor  
A. E. Miller  
By Watson & Watson  
Attorneys

No. 686,414. Patented Nov. 12, 1901.
A. E. MILLER.
BROOM SEWING MACHINE.
(Application filed Feb. 7, 1900.)
(No Model.) 8 Sheets—Sheet 4.

Witnesses
Inventor
A. E. Miller
By Watson & Watson
Attorneys

No. 686,414. Patented Nov. 12, 1901.
A. E. MILLER.
BROOM SEWING MACHINE.
(Application filed Feb. 7, 1900.)
(No Model.) 8 Sheets—Sheet 6.
Fig. 6.
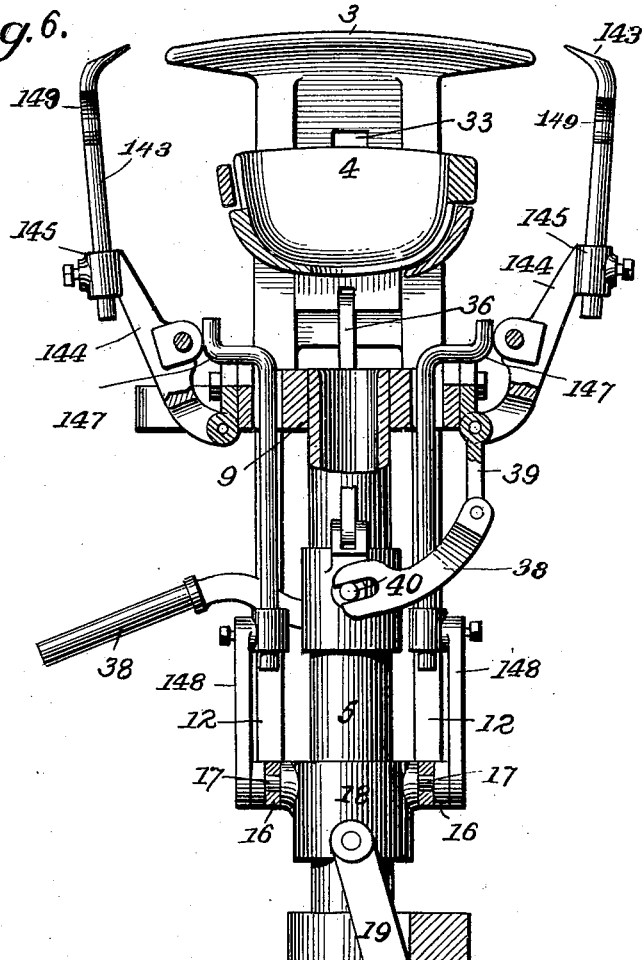
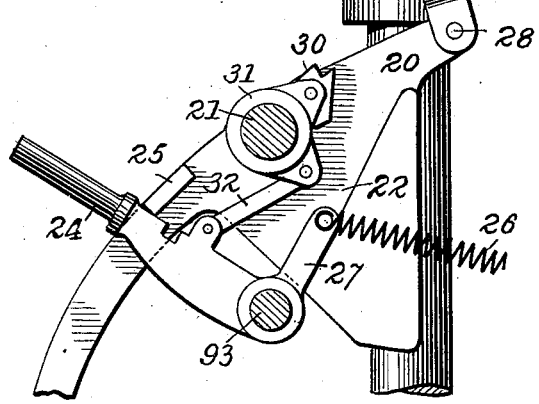
Fig. 7.
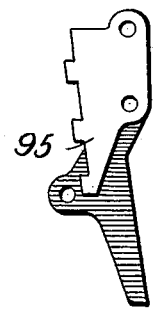
Fig. 1ᵃ
Witnesses
Inventor
A. E. Miller
By Watson & Watson
Attorneys No. 686,414. Patented Nov. 12, 1901.
A. E. MILLER.
BROOM SEWING MACHINE.
(Application filed Feb. 7, 1900.)
(No Model.) 8 Sheets—Sheet 7.

No. 686,414. Patented Nov. 12, 1901.
A. E. MILLER.
BROOM SEWING MACHINE.
(Application filed Feb. 7, 1900.)

(No Model.) 8 Sheets—Sheet 8.

Witnesses
J. G. Hinkel
C. W. Clement

Inventor
A. E. Miller
By Watson & Watson
Attorneys

THE NORRIS PETERS CO., PHOTO-LITHO., WASHINGTON, D. C.

UNITED STATES PATENT OFFICE.

ANDREW E. MILLER, OF BALTIMORE, MARYLAND, ASSIGNOR TO HERBERT CASSARD, OF CHICAGO, ILLINOIS.

BROOM-SEWING MACHINE.

SPECIFICATION forming part of Letters Patent No. 686,414, dated November 12, 1901.

Application filed February 7, 1900. Serial No. 4,370. (No model.)

*To all whom it may concern:*

Be it known that I, ANDREW E. MILLER, a subject of the Queen of Great Britain, residing at Baltimore, in the State of Maryland, have invented certain new and useful Improvements in Broom-Sewing Machines, of which the following is a specification.

My present invention relates to various improvements in broom-sewing machinery of the type illustrated in United States Letters Patent No. 618,798, granted to me January, 31, 1899.

The improvements are described in detail in the following specification, reference being had to the accompanying drawings, in which—

Figure 1:
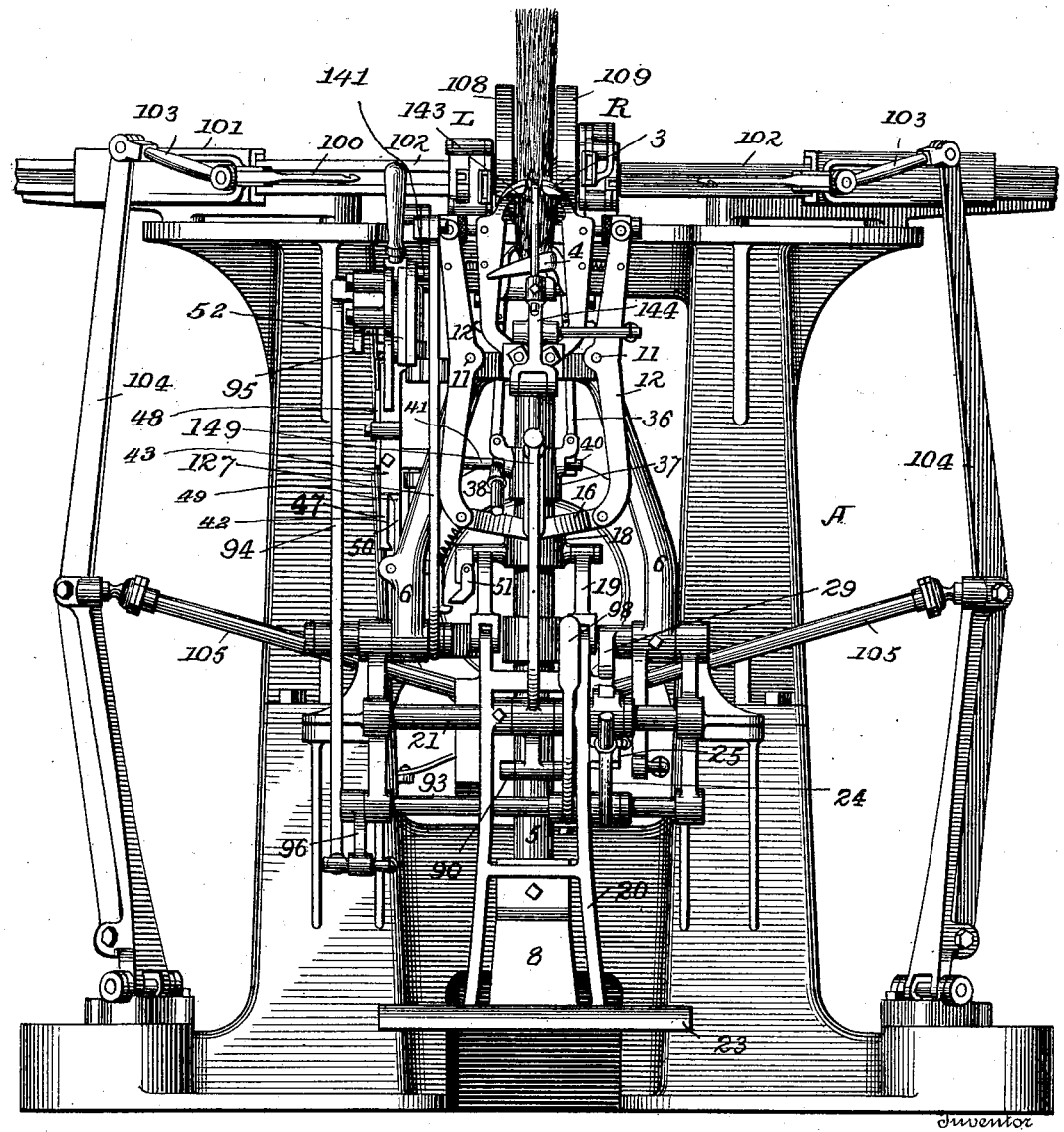
Figure 2:
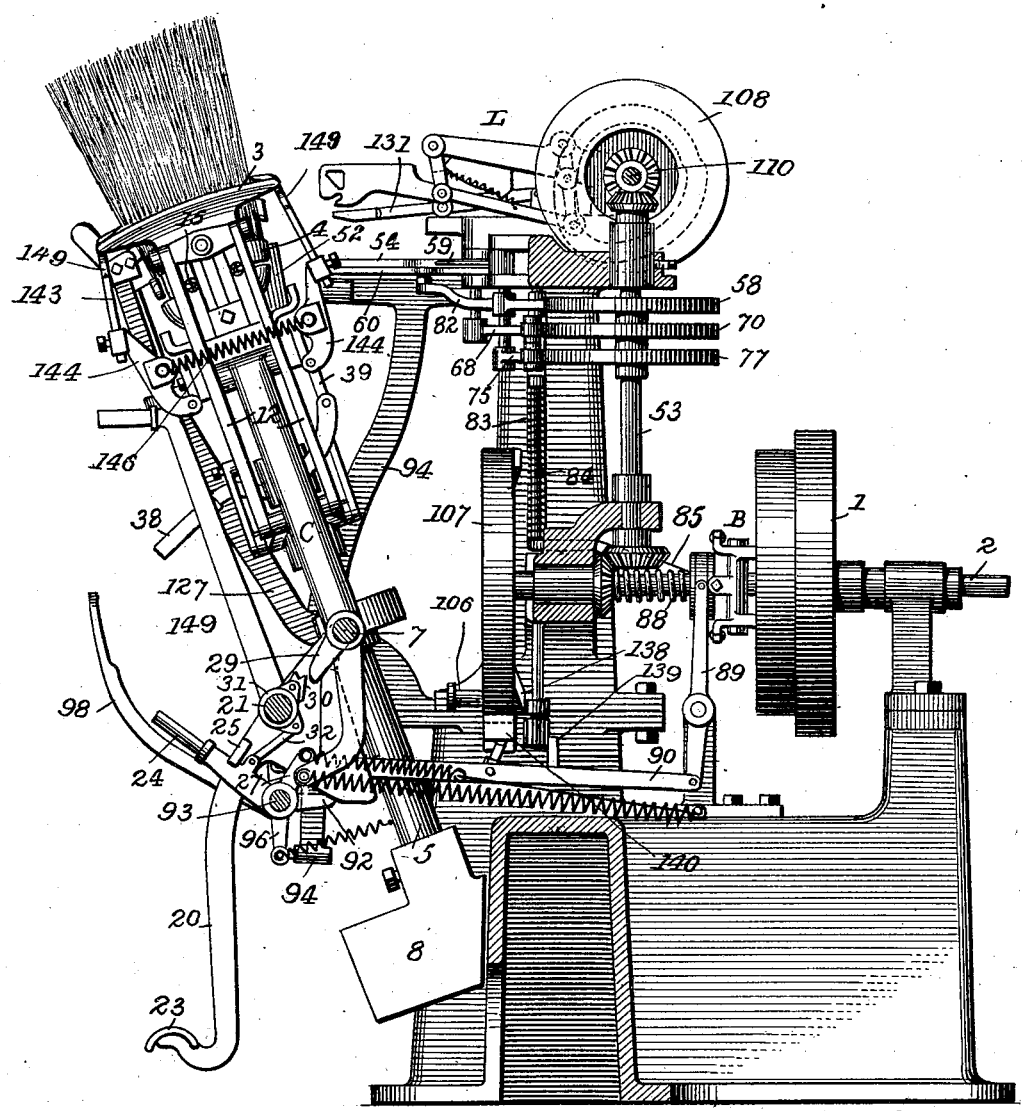
Figure 3:
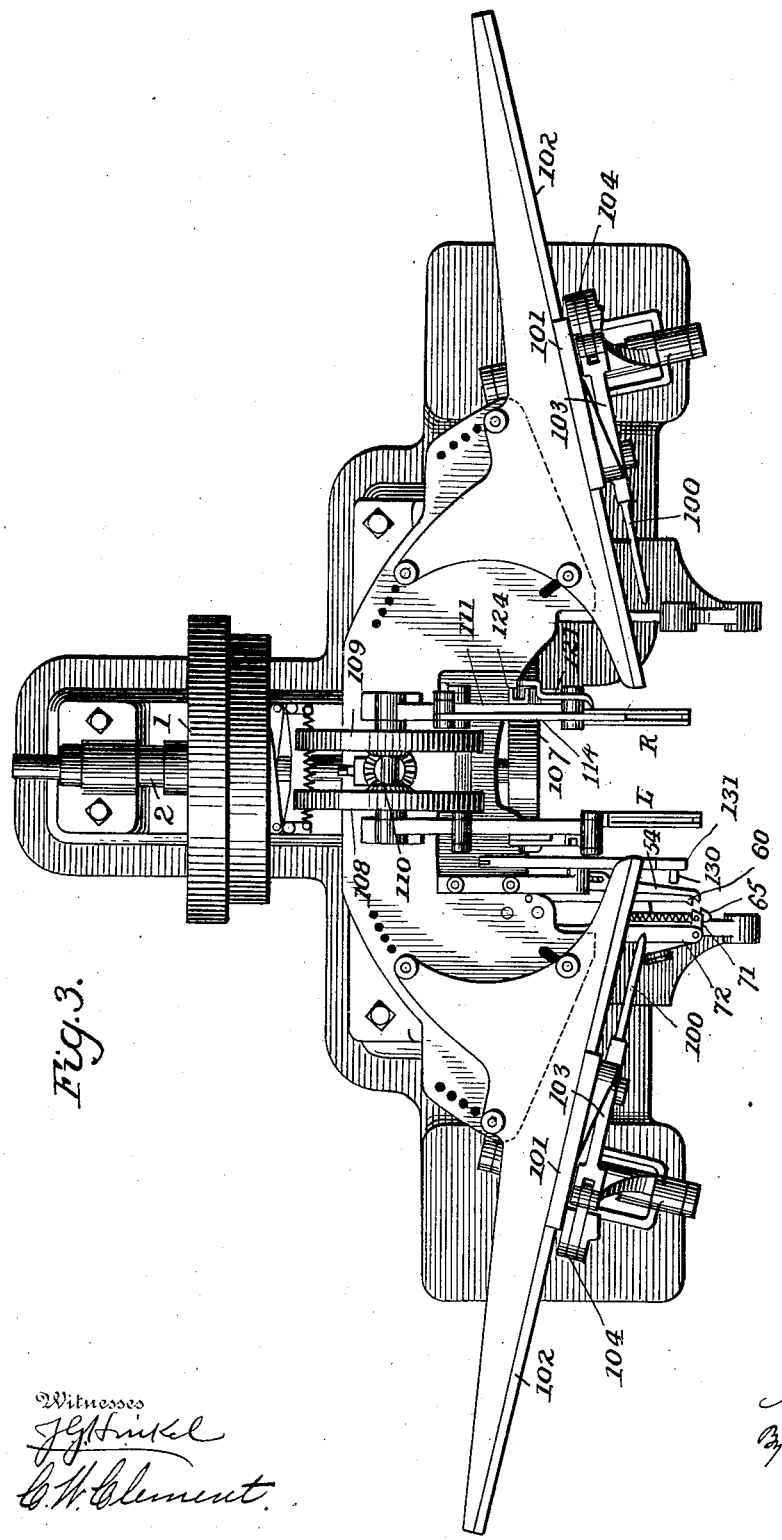
Figure 4:
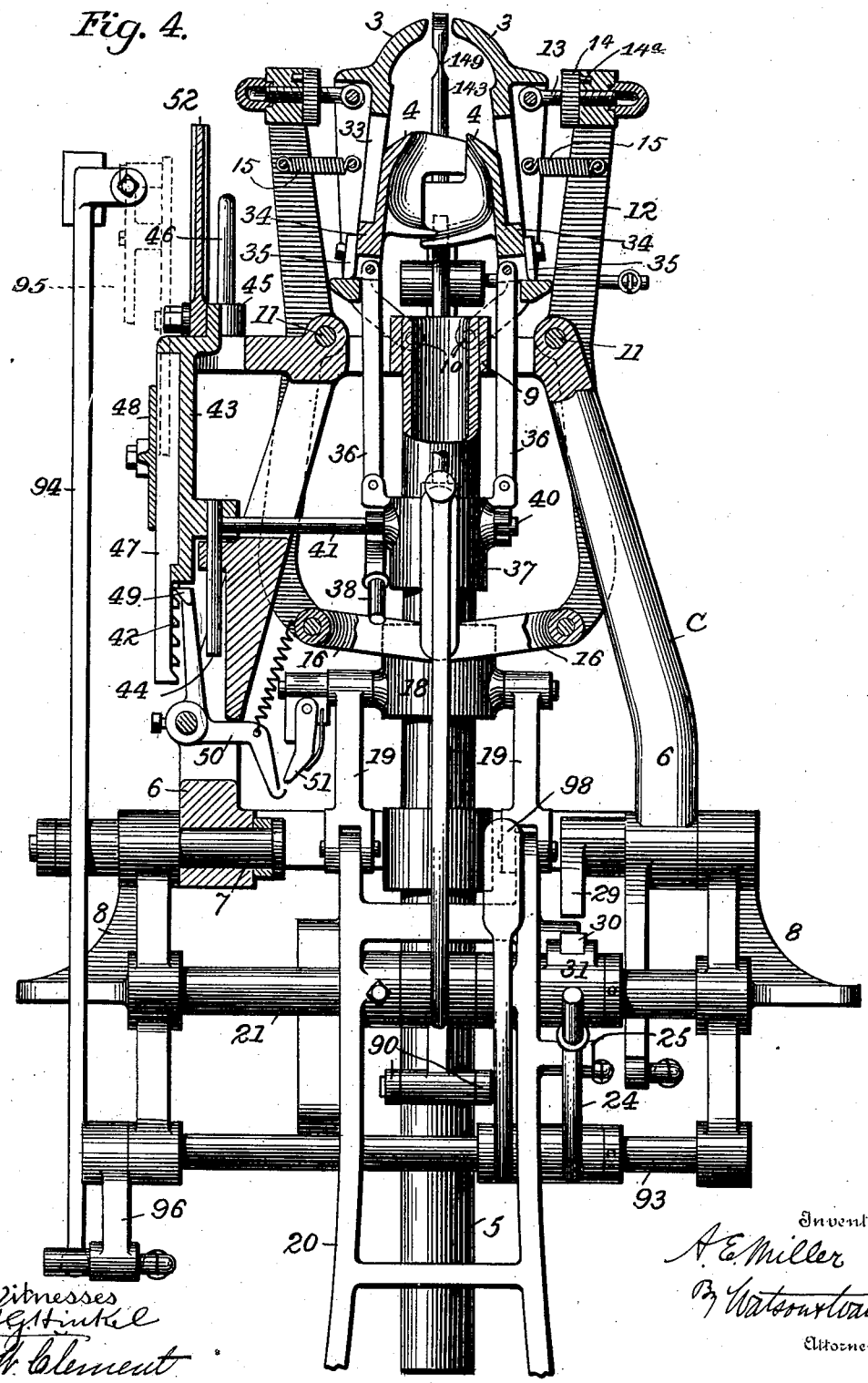
Figure 5:
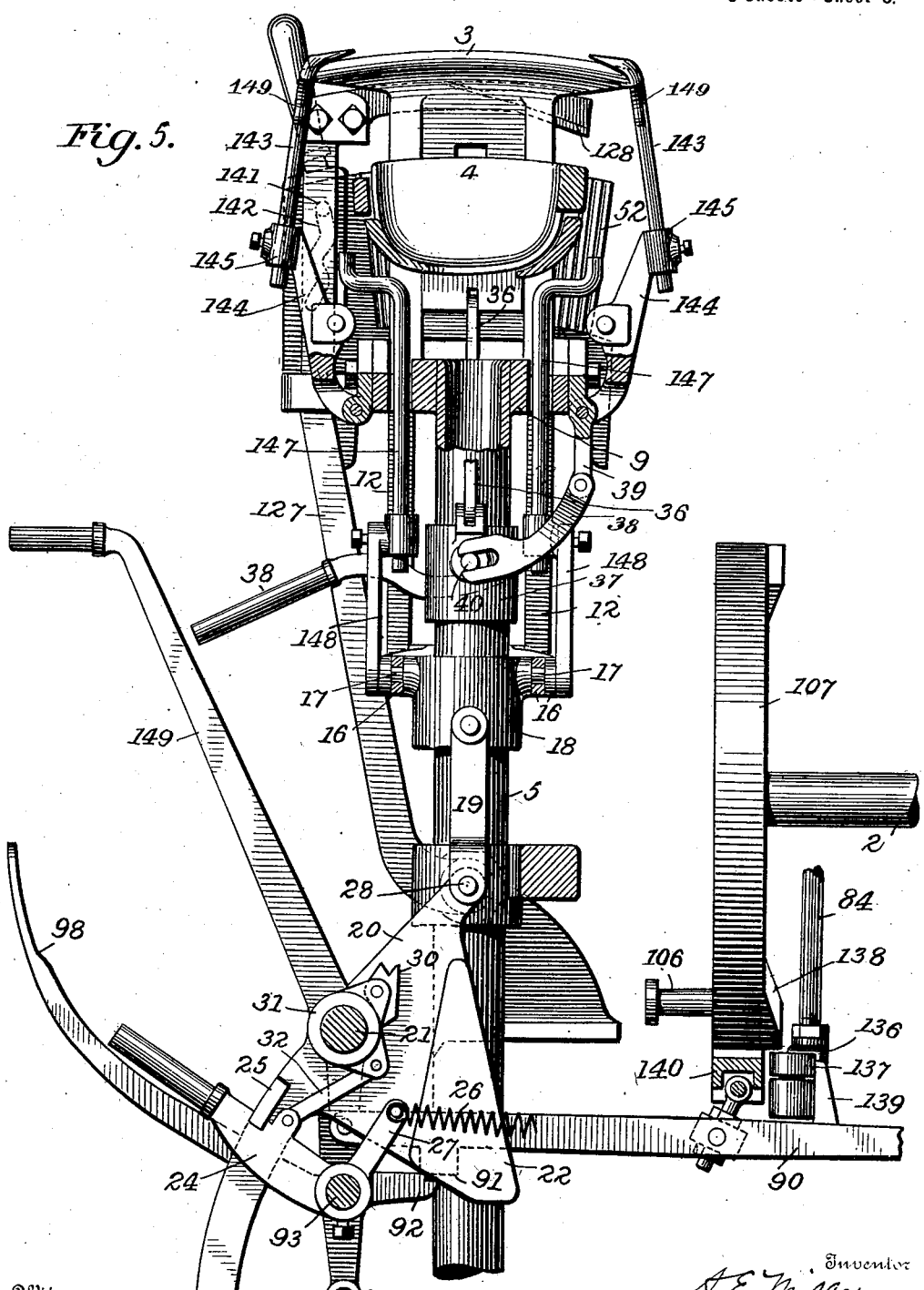
Figure 8:
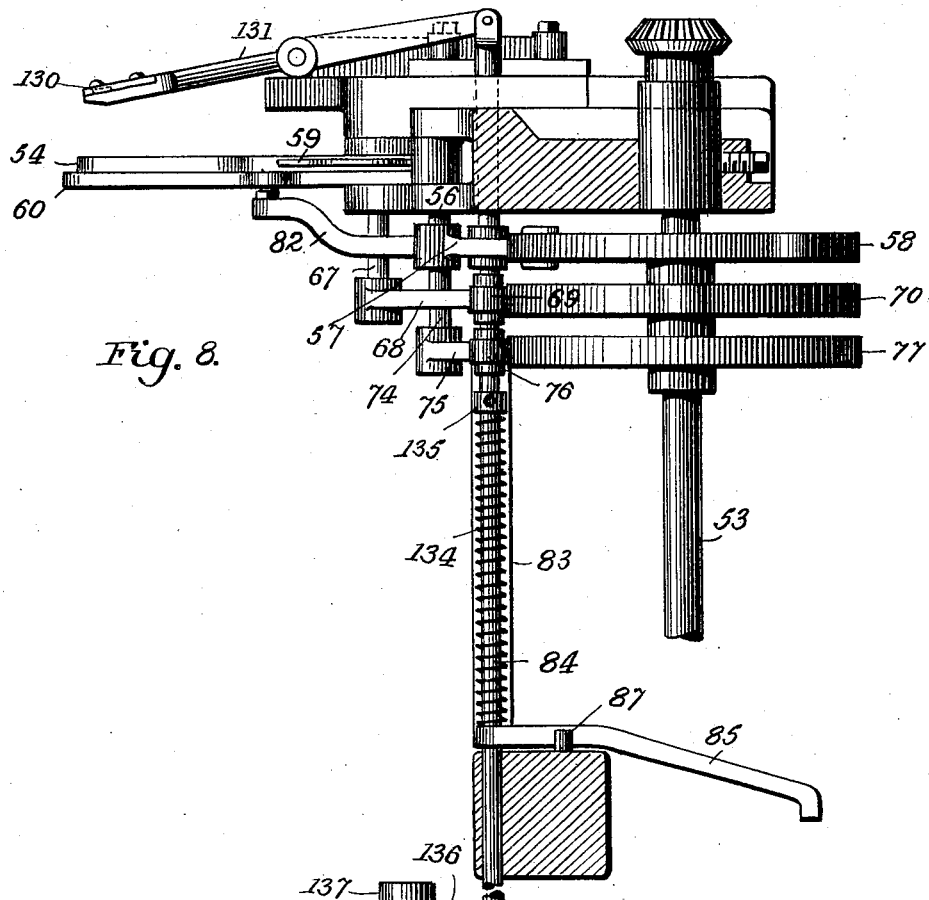
Figure 9:
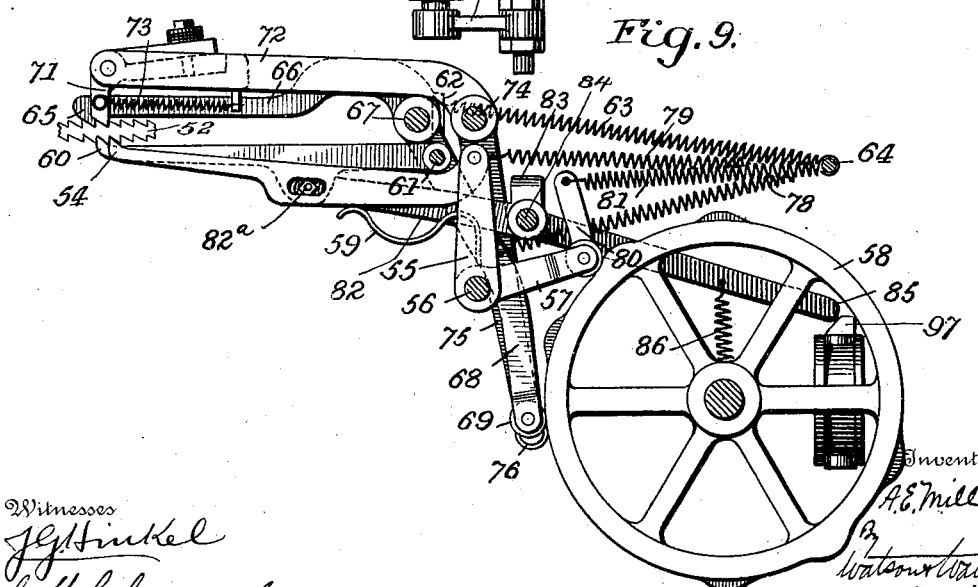
Figure 10:
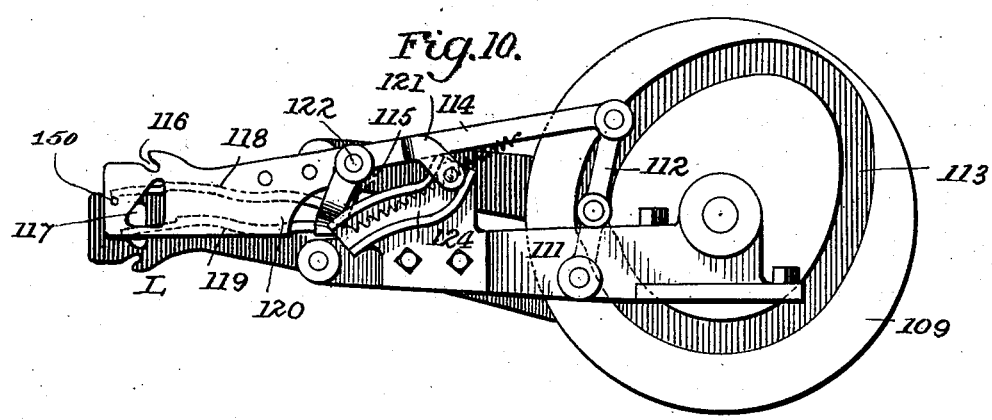
Figure 11:
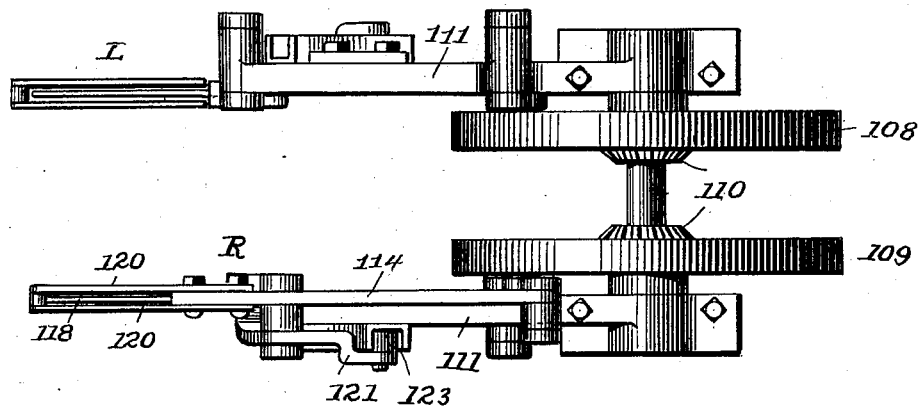
Figure 12:
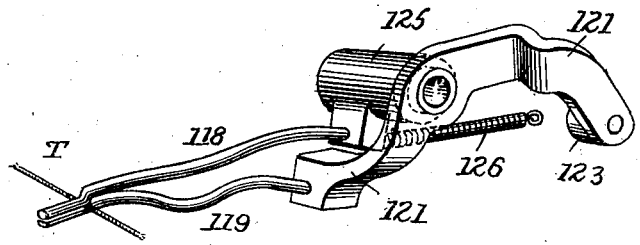

Figure 1 is a front elevation of the machine. Fig. 1ª is a view of the stepped plate which coöperates with the starting-lever to start the machine at different points in the successive lines of stitches. Fig. 2 is a left side elevation, partly in central section. Fig. 3 is a plan view, the vising, threading, and feeding mechanisms being omitted. Fig. 4 is a front elevation of the vise-frame, partly in section. Fig. 5 is a side elevation of the same, partly in section, and showing the thread-supports closed. Fig. 6 is a similar view showing the thread-supports open. Fig. 7 is a detail. Fig. 8 is a side elevation of the feeding mechanism. Fig. 9 is a plan view of the same. Fig. 10 is a right side elevation of the threading devices and their operating-cams. Fig. 11 is a plan view of the same. Fig. 12 shows one of the clamping-fingers in perspective.

The movable parts of the machine are mounted on a frame A, which may be of any suitable construction, or upon brackets supported by said frame. Power is applied by means of a driving-pulley 1, which runs loosely on a shaft 2 and is periodically connected to the shaft by means of a clutch B. The various moving parts are driven from the shaft 2 by connections, which will be described in their proper order.

*Vising mechanism.*—The vising mechanism comprises a pair of vise-jaws 3, which grip the broom securely while it is being sewed, and a pair of clamping-jaws 4, which serve to form or shape the broom-head and hold it during its vertical adjustment while the grip of jaws 3 is relaxed. The vise-jaws 3 are carried by a vise-frame C, consisting of a central tubular stem 5, supported by legs 6 6, pivotally carried by trunnions 7, mounted on brackets 8. The tubular part 5 is arranged in the central plane of the machine between the legs 6, and at it lower end it carries a weight 8, which tends to hold it in an upright position, Figs. 2 and 4. As shown in Fig. 4, the jaws 3 are pivoted to the head 9 of the vise-frame at 10. Also pivoted to said head at the points 11 are a pair of levers 12, the upper ends of which are adjustably connected to the vise-jaws by means of links 13, which are threaded and provided with adjusting-nuts 14 to provide for adjustment of the jaws. Each nut 14 is provided with a pin 14ª, which enters one of a series of holes in the lever to lock the nut in any desired adjustment. Springs 15 draw the nuts 14 tightly against levers 12.

The lower ends of the levers 12 are connected to toggle-links 16, the inner ends of said links being pivotally connected to trunnions 17 on a collar 18, which slides freely on the central stem 5 of the vise-frame, Figs. 1, 4, and 5. When the collar 18 is raised until the links 16 are nearly in a plane at right angles with the stem 5, as shown in Fig. 4, the jaws 3 will be closed powerfully upon a broom, and when the collar 18 is lowered the jaws are opened. The collar 18 is operated by means of links 19 and a lever 20, carried by a shaft 21. Lever 20 is provided with a weight 22, which tends to rock the lever to open the vise-jaws. It is also provided with a treadle 23, by means of which the vise-jaws can be closed by foot-power, Figs. 1 and 2.

The vise is locked in the closed position by means of a notched lever 24, which engages the plate or projection 25. The lever 24 is drawn into the locking position by means of a spring 26, connected to its arm 27, and when the treadle is depressed until the projection 25 reaches the notch in lever 24 it is automatically locked in said position and the vise-jaws are locked upon the broom. It will be noted that when the vise-jaws are so locked the pivotal connections 28 between the links 19 and the lever 20 are in line with the trunnions 7, upon which the vise-frame is pivoted, Figs. 1, 4, and 5. Hence the vise may be tilted upon its vise-frame and may be swung forward and backward upon its trunnions without disturbing the adjustment of the vise or the grip of the vise upon the broom.

The vise is automatically unlocked when it is moved to its forward position as follows: A projecting arm 29 engages a pawl 30, which is loosely pivoted to an arm on a collar 31, free to revolve on the shaft 21. The collar 31 is connected by link 32 to the locking-lever 24, Figs. 2, 4, and 5. As the vise is moved backward to the sewing mechanism the arm 29 strikes the pawl 30 and rocks it idly upon its pivot without affecting the locking-lever; but when the vise is moved forward into the position shown in Fig. 2 the arm 29 engages the pawl 30, which is not free to rock in the opposite direction, and the collar 31 is thereby rotated and the lever 24 thrown out of engagement with the projection 25 on the treadle-lever. The weight 22 thereupon throws the treadle forward and opens the vise 3.

*Spacing between rows of stitches.* — The broom is supported in and adjusted vertically by the clamps 4, Figs. 4, 5, and 6. These clamps slide on the inner faces of the vise-jaws and are guided in slots 33 in said jaws, the clamps having projections 34, which enter the slots and to which cap-plates 35 are attached. The clamping-jaws 4 are connected by links 36 and collar 37, sliding upon the central stem 5 of the vise-frame. The clamps are raised to begin sewing a broom by means of a lever 38, which is connected to the head of the vise-frame by a link 39. The lever 38 has two slotted arms which engage trunnions 40 41 on the collar 37.

The clamps 4 are sustained and fed downward step by step by means of a rack 42, which is rigidly connected to the collar 37. In the present instance the trunnion 41 is prolonged and forms the connecting part between the rack and the collar. The rack 42 is carried by a slide-frame 43, the lower part of the frame having a pin 44, which slides vertically in an opening in the main frame, while the upper part of the frame has an eye 45 sliding on a vertical pin 46.

The rack 42 is composed of a series of bars 47, each having a tooth at its lower end. The bars are of different lengths and are adjustably held on the slide 43 by a clamp-plate 48. A wide pawl 49 on the pawl-lever 50 is adapted to engage in any of the teeth of rack 42. When the clamp 4 is raised to its highest position, the pawl 49 engages the lowest tooth of the rack and sustains the clamp in the said highest position until the pawl-lever 50 is rocked. A device is provided for giving the pawl-lever a quick rocking movement, which causes the pawl to release one tooth and engage the next. This movement takes place each time the vise is opened, and it is accomplished by means of a pawl 51, carried by collar 18, striking the inner end of pawl-lever 50 and momentarily throwing the pawl 49 out of engagement with the rack. The vise 4 and the broom are thus lowered one step automatically each time the vise is opened.

*Sewing feed mechanism.* — Upon the slide 43 is a feed-rack 52, Figs. 2, 4, 5, and 9, having radially-arranged teeth on both of its faces. Said teeth are approximately radial to the trunnions upon which the vise-frame rocks, and the rack 52 is therefore fan-shaped. By arranging the teeth radially the stitches of the lower seams are made slightly shorter than the stitches of the upper seams, the corresponding stitches of the several seams being arranged in radial lines. It thus becomes practicable to stagger the stitches in adjacent rows with mathematical accuracy.

The pawls which coöperate with the rack 52 are shown in Figs. 8 and 9. These pawls are operated by cams upon the vertical cam-shaft 53, which is connected by bevel-gears with the drive-shaft 2. The rack is moved positively forward by pawl 54, operated by lever-arm 55, rock-shaft 56, and arm 57, carrying a roll which coöperates with projections on the upper cam-wheel 58. The arm 57 has an extension 80, to which is connected a spring 81 for the purpose of holding the cam-roll of arm 57 to its cam. The pawl 54 is pressed against the rack by means of a spring 59. A holding-pawl 60, pivoted at 61, prevents the rack from returning when the moving pawl is drawn back by its cam. The pivot-shaft 61 carries an arm 62, to which is connected a spiral spring 63, extending to the fixed stud 64. The spring 63 tends to hold the pawl 60 in constant contact with the rack. The operation of the pawls 54 and 60 will be obvious without further description.

To prevent the rack from being thrown more than one tooth at a time, a pair of reverse-pawls are used which engage the rack alternately. One of these pawls 65 is carried by a lever 66, mounted on rock-shaft 67. Said shaft has an arm 68, carrying a cam-roll 69, which coöperates with cam-wheel 70. The second stop-pawl 71 is pivotally mounted on a lever 72 and normally drawn rearward by means of a spring 73, connected to said lever. This spring is sufficiently weak to be readily overcome by the moving pawl 54. The lever 72 is connected to a rock-shaft 74, and upon the lower arm of said shaft is an arm 75, carrying cam-roll 76, coöperating with a cam 77 on shaft 53. The roll 69 is urged toward cam 70 by a spring 78, and the roll 76 is urged toward cam 77 by a spring 79, both springs being connected to the stud 64.

To permit the rack to return after it has been fed forward, the pawls 54 and 60 are temporarily withdrawn by means of a lever-arm 82, which is carried on the upper end of a yoke piece or bar 83, Figs. 8 and 9. Lever 82 carries a pin 82ª, which engages slots in the pawls. This yoke 83 is loosely pivoted at its upper and lower ends upon a vertically-sliding rod 84. The lower end of the yoke-piece carries an arm 85, which coöperates with the stopping and starting mechanism, said arm being rocked by a projection 97 upon the collar of clutch B, the result being that when the machine is stopped the arms 82 85 are rocked and the pawls 54 60 drawn out of engagement with the rack. When the machine is started, the arm 85 is drawn by a spring 86 against a stop 87, Figs. 8 and 9, and the pawls again engage with the rack.

*Starting mechanism.*—The clutch B may be of any desired construction—such, for instance, as that shown in my patent above mentioned. A spring 88 normally closes the clutch and engages the drive-wheel 1 with the shaft 2. The clutch is connected by a lever 89 with a reciprocating frame 90, comprising two horizontal bars. The forward end of the frame 90 has a stop projection 91, Figs. 2 and 5, which is adapted to be engaged by a stop-arm 92, carried by rock-shaft 93 to hold the clutch out of engagement with the drive-wheel.

The machine is so constructed that when the vise is pushed to the rear to bring the broom to the sewing mechanism the frame 90 will be released from the stop-arm 92 and spring 88 permitted to throw the clutch into action. This is accomplished by means of a starting-lever 94, Figs. 2 and 4, the upper end of which is engaged by a notched plate 95, carried by the slide 43. The lower end of the lever 94, Figs. 1, 2, and 4, engages an arm 96 on the rock-shaft 93, which carries the stop-arm 92, drawing said stop-arm out of the path of the stop projection 91 and permitting the spring 88 to throw the clutch into action.

In order to stagger the stitches in alternate lines, it is necessary to start the machine at different points in the successive lines of stitching. This is accomplished by staggering or stepping the rear or operative edge of the plate 95, as shown in Fig. 1ª. The rock-shaft 93 also carries a lever 98, by means of which the operator can start the machine at any time by the use of the knee or hand, Figs. 1, 4, and 5.

*Sewing mechanism.*—The needles 100 are carried on slides 101, which travel on horizontal guideways 102. The slides are operated by links 103, levers 104, and connecting-rods 105, which are jointed to a crank-pin 106 on a disk 107. The needle-operating mechanism just described and also the means for angularly adjusting the guides 102 and the arms 104 are fully described in my patent previously referred to.

The threading mechanism is illustrated in Fig. 2 and Figs. 10 to 12, inclusive. Referring to said views, 108 109 indicate cam-disks, which are rotated in opposite directions by means of bevel-gears 110 in mesh with a bevel-gear on shaft 53. There are two threading mechanisms L and R, which are exactly alike, with the exception that one is inverted with respect to the other. It will therefore only be necessary to describe the right-hand threading mechanism R. On the bracket 111, which carries the cam-disk 109, is pivoted a lever 112, having a cam-roll which runs in cam-groove 113. To the upper end of the lever 112 is pivotally connected a threading-arm 114, which arm is supported midway of its length by a link 115, the lower end of which is pivoted to the bracket 111. The free end of the arm 114, which consists of two plates 120, is provided with a notch 116, into which the thread is passed by the operator after it is wound about the broom to form a binder and before the first stitch. At the first rotation of the cam 109 the thread in the notch is carried over the left-hand needle and engaged with the hook thereof. The left-hand needle then recedes, drawing the thread through the broom, and the right-hand needle comes forward and passes first through an opening 117 in arm 114 and then through the broom. The thread is then engaged with the right-hand needle, which is drawn back, pulling the thread with it through the opening 117. When the thread is drawn through the opening 117 to its full extent, it is gripped by a pair of fingers 118 119, which are movably mounted between the plates 120, forming the forward end of the arm 114. Finger 119 is carried by a lever 121, which is pivoted to a stud 122 on the arm 114. The rear end of the lever has a roll 123, which engages a fixed grooved cam 124 upon the bracket. This cam is of such shape that the finger 119 will be raised into contact with the finger 118 during the first portion of the forward movement of the arm 114, and during the latter half of said movement the fingers will be held together, so as to grip the thread T and carry it around the needle. The upper finger 118 is pivoted to a hub 125, which is free to rotate on the sleeve which forms the bearing of the lever 121. The spring 126 tends to constantly draw the finger 118 down, and a pin 150 on the arm 114 limits its downward movement. The cam 124 is arranged to cause the lower finger to raise the upper finger, and the thread is thereby gripped with the full force of the spring 126. The manner in which the thread is carried about the needle is fully described in my patent previously referred to, although the specific construction of the threading mechanism above described is different from that shown in said patent.

*Automatic stopping mechanism.*—This mechanism is practically the same as that shown in my prior patent, above referred to. Referring to Figs. 2, 5, 7, and 8, 127 is an arm which is carried by the vise-frame and upon which is a switch device comprising an incline 128 and a spring-plate 129. As the arm 127 is carried to the rear with the vise a projection 130 on the lever 131 rides up the incline 128 onto the top thereof, 132. During the forward movement of the vise, due to the feeding mechanism, the projection 130 rides on top of the switch-plate 129, holding the rear end of the lever 131 depressed. To said rear end of lever 131 is connected a vertically-sliding rod 84. A spring 134, encircling said rod, presses against a collar 135 and constantly tends to raise the rod and depress the forward end of lever 131. About the time the last stitch is formed the projection 130 drops off the end of plate 129, and spring 134 quickly raises the rod 84. The lower end of rod 84 carries an arm 136, which is free to rock on said rod. The said arm carries a cam-roll 137, which is raised by rod 84 into the path of cam projections 138 on the disk 107. There are two of these cam projections diametrically opposite, and during the next half-revolution of the disk 107 one of the cams 138 rocks the lever 136, and said lever engages a projection 139 on the frame 90 and moves it to the rear, thus compressing the clutch-spring and throwing the clutch out of engagement with the drive-wheel. At the same time a brake 140 is applied to the disk 107 and the machine immediately stopped. The brake 140 is connected to the frame 90 by a link 140$^a$.

Owing to the staggering of the stitches the machine should be stopped at different points in the travel of the vise-frame for different seams. In other words, it should be stopped at alternate stitches in the successive rows of stitches. This is accomplished by vibrating the lever 127 with reference to the vise-frame, the lever 127 being provided for this purpose with a pin 141, which engages a zigzag groove 142 in the plate carried by the slide 43, Figs. 5 and 7. As the zigzag groove is moved up and down lever 127 is rocked with reference to the vise-frame and the point of stoppage of the machine alternated for successive lines. The machine may be stopped at any time by means of a hand-lever 149, the lower end of which is connected to the frame 90.

*Binder-supports.*—The binder-supports 143 are carried on lever-arms 144. Said supports consist of rods which are adjustably fixed in sockets 145 on the levers. The levers are connected by a spring 146, which tends to draw the supports into contact with the broom just above the vise-jaws, as shown in Figs. 2 and 5. The binder-supports are moved away from the broom automatically when the vise is opened by means of cam-rods 147, connected to the collar 18 by links 148. The supporting-fingers 143 are cut away or weakened at points 149, so that they will yield or break if struck by one of the needles, as sometimes happens. It is found cheaper and easier to replace a binder-support than a needle.

In my copending application, Serial No. 4,369, filed February 7, 1900, I have embodied certain features which are illustrated in this case, but not claimed herein.

What I claim, and desire to secure by Letters Patent, is—

1. In a broom-sewing machine the combination with the vise and the toggle-lever adapted to close the vise and to open the vise automatically when released, of an automatic locking device constructed and arranged to positively lock the toggle-lever when the vise is closed upon a broom.

2. In a broom-sewing machine, the combination with the vise, and a toggle-lever for closing the same, of a locking device constructed and arranged to lock the toggle-lever when the vise is closed upon a broom, and means for automatically unlocking said toggle-lever after each row of stitches is formed.

3. In a broom-sewing machine, the combination with a rocking vise-frame, a vise carried by said frame, a toggle-lever for closing said vise, and means for locking said toggle-lever, of unlocking mechanism for said toggle-lever adapted to be automatically operated by the vise-frame as the latter is rocked to its forward position.

4. In a broom-sewing machine, the combination with the rocking vise-frame, and the vise carried thereby, of the treadle and means operated thereby arranged to close the vise, the notched lever arranged to lock the vise in a closed position, a fixed arm on the vise-frame, and means whereby said arm effects the rocking of said notched lever to unlock the vise as the vise-frame approaches its forward position.

5. In a broom-sewing machine, mechanism for feeding the broom to the sewing devices, comprising a rack, pawls for positively feeding the same and means for operating said pawls, in combination with a second rack having reversed teeth and pawls for positively limiting its movement, said racks being rigidly connected.

6. In a broom-sewing machine, mechanism for feeding the broom to the sewing devices, comprising a rack having reversely-inclined teeth on its opposite faces, in combination with holding and moving pawls operating on one face to positively feed the rack, a pair of pawls operating on the opposite face to positively prevent undue movement of said rack and means for operating said pawls.

7. In a broom-sewing machine, the combination of a rack-plate having radially-arranged elongated teeth on its opposite faces, pawls coöperating with one face to positively move the rack, pawls coöperating with the opposite face to positively prevent undue movement thereof, suitable cams for operating said pawls at proper intervals, and means for automatically throwing the moving pawls out of engagement with the rack, to permit of its return, when the machine is stopped.

8. In a broom-sewing machine, the combination with a broom-feeding rack, and pawls for positively moving said rack step by step to feed the broom to the sewing mechanism, of a rocking arm and connections for throwing said pawls out of engagement with the rack, and means for rocking the arm automatically to release the pawls each time the machine is stopped.

9. In a broom-sewing machine, the combination with a broom-feeding rack and pawls arranged to move said rack positively step by step in one direction to feed the broom to the sewing mechanism, of means for automatically disengaging said pawls from the rack at the end of each row of stitches, and holding said pawls out of engagement while the rack is being moved in the opposite direction.

10. In a broom-sewing machine, a needle and operating mechanism therefor, in combination with a threading device comprising an arm operating to carry the thread about the needle, a finger pivotally carried by said arm and operating to grip the thread and hold it while it is being passed around the needle, and a fixed cam controlling the movement of said finger.

11. In a broom-sewing machine, a needle and operating mechanism therefor, in combination with a threading device comprising an arm operating to carry the thread about the needle, a pair of fingers pivotally carried by said arm and operating to grip the thread and hold it while it is being passed around the needle, and a fixed cam controlling the movement of said fingers.

12. In a broom-sewing machine, a needle and operating mechanism therefor, in combination with threading mechanism comprising a pair of links pivoted to a fixed support, an arm carried by the free ends of said links and having a thread-opening, a cam operating to rock one of said links, and a pair of fingers carried by the arm and adapted to grip the thread and hold it during a portion of the movement of said arm.

13. In a broom-sewing machine, a needle and operating mechanism therefor, in combination with the threading mechanism comprising a pair of links pivoted to a fixed support, a threading-arm carried by said links, a cam-lever pivoted to said arm, a fixed cam arranged to control said cam-lever, a gripping-finger carried by said cam-lever, and a second gripping-finger pivotally mounted on said arm, said fingers being adapted to grip and hold the thread during a portion of the movement of the arm.

14. In a broom-sewing machine, a needle and operating mechanism therefor, in combination with the threading mechanism comprising a pair of links pivoted to a fixed support, a threading-arm carried by the free end of said links, a thread-receiving opening in the free end of said arm, a pivoted cam-lever carried by said arm, a finger on the cam-lever arranged to move across said opening, a second finger normally standing at the upper side of the opening, and a cam arranged to close said fingers upon a thread passing through the opening, as and for the purpose set forth.

15. In a broom-sewing machine, the combination with the needles and mechanism for operating the same, of a binder-support comprising a pair of fingers adapted to engage the edges of the broom above the vise, said fingers being constructed to resist bending in the plane of the broom and being relatively weak in the direction of movement of the needles, that is, in a direction at right angles to said plane, whereby the finger is adapted to yield if struck by a needle.

16. In a broom-sewing machine, the binder-support comprising a pair of levers having sockets, a pair of binder-supporting fingers removably held in said sockets, and means for automatically operating the levers to move the supports to and from the vise.

17. In a broom-sewing machine, the combination with the needles and mechanism for operating the same, and the levers 144 having sockets, of the binder-supporting fingers 143 having weak portions adapted to yield if the binder-support is struck by a needle, and means for rocking the levers to carry the binder-supports to and from the vise.

In testimony whereof I affix my signature in presence of two witnesses.

ANDREW E. MILLER.

Witnesses:
HOWARD D. ADAMS,
J. HENRY STROHMEYER.